April 7, 1925.

C. C. HAIGLER

BEARING

Filed June 21, 1923

INVENTOR
Claude C. Haigler
BY John A. Crawsmith
ATTORNEY

Patented Apr. 7, 1925.

1,532,181

UNITED STATES PATENT OFFICE.

CLAUDE C. HAIGLER, OF SAN JOSE, CALIFORNIA.

BEARING.

Application filed June 21, 1923. Serial No. 646,865.

*To all whom it may concern:*

Be it known that I, CLAUDE C. HAIGLER, a citizen of the United States, and resident of San Jose, in the county of Santa Clara and State of California, have invented certain new and useful Improvements in Bearings, of which the following is a specification.

It is one object of my invention to provide a bearing and a mounting therefor that will permit the quick and easy removal and replacement of the bearing in said mounting.

It is another object of my invention to provide a swivel bearing equipped with a suitable automatic oiling device within its own structure.

It is still another object of my invention to provide a swivel bearing of the character indicated that will be economical to manufacture, simple in construction and highly efficient in its practical application.

In the drawing:—

Figure 1:
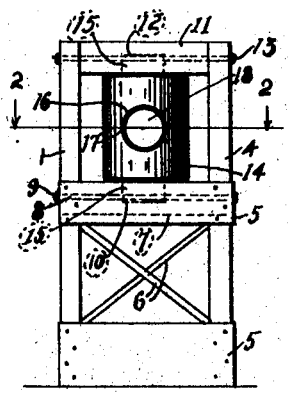
Figure 1 is a front elevation of the device.
Figure 3:
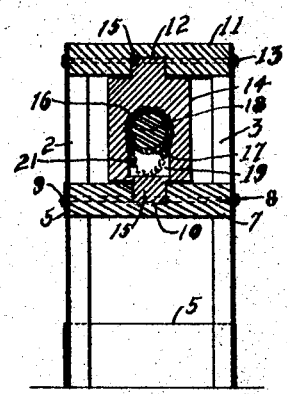
Figure 3 is a sectional view on line 3—3 of Figure 2.
Figure 2:
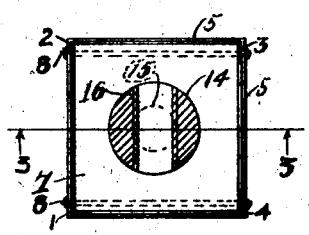
Figure 2 is a sectional view on line 2—2 of Figure 1.
Figure 4:
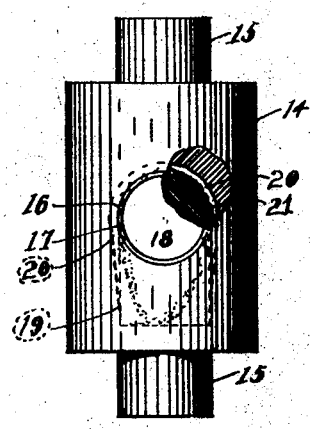
Figure 4 is an enlarged detail of the bearing member.

Referring more particularly to the drawings, 1—2—3—4 indicate four upright corner pieces of angle iron, spaced and supported by horizontal members as 5 riveted thereto and braced by crossed elements as 6.

At 7 I show a base member arranged horizontally in the frame and about midway its height, the same being securely mounted in the frame by means of bolts 8 passing through the frame and base member and secured by nuts 9. In the center of the upper surface of base member 7 is formed a cylindrical socket 10.

At 11 I show a top member having a cylindrical socket 12 formed in the center of its lower surface, this member being so proportioned as to slidably engage the corner pieces 1—2—3 and 4, and when in position therein it is held in rigid relation thereto by bolts 13 passing through both top member 11 and the corner pieces referred to. When secured in the position described the sockets 10 and 12 are in axial alignment with each other.

At 14 is shown a cylindrical bearing member having cylindrical pins 15 arranged on either end thereof so proportioned as to engage the sockets 10 and 12 as shown, the bearing member thereby being permitted to revolve about its vertical axis.

Passing horizontally through member 14 is a cylindrical orifice 16 suitably lined with Babbitt metal 17 to engage a shaft 18. In the center of bearing member 14 and extending downwardly from orifice 16 and communicating therewith is a recess 19 forming a receptacle for a lubricating fluid. The side walls of this receptacle and the bearing wall have a groove 20 formed therein whereby a chain 21 may be hung on the shaft 18, the said chain being endless and extending downwardly into receptacle 19. The rotation of the shaft 18 carries the chain around and causes it to carry oil up on the shaft for lubricating the same.

There is but little movement of the pins 15 so they may be lubricated in any suitable manner.

In a device constructed as above set forth the shaft 18 is perfectly lubricated for a long period of time without refilling of the reservoir 19.

In the construction of oil wells the shaft 18 is subjected to a lateral strain which ordinarily subjects the bearing surface to unequal wear whereby undue friction is developed between the shaft and bearing causing the bearing to become bell-shaped at its ends and frequently creating so much heat as to cause disastrous fires. With the bearing construction herein disclosed the swivelling movement of the bearing on pins 15 permits the shaft to retain its true alignment with the bearing surface thereby eliminating the unequal wear referred to and consequently adding materially to the life of the bearing.

The combination of swivelled bearing and the lubricating device reduces the friction between shaft and bearing to a minimum and at the same time permits the bearing to retain its true shape indefinitely.

If in the course of time it becomes desirable for any reason to remove the bearing member 14, it is only necessary to remove the bolts 13 and top member 11 whereupon the whole member together with its oiling device may be lifted out and another one placed therein.

It may be seen from the foregoing that I have produced a device that is not only simple in construction and economical to manufacture, but that successfully overcomes the danger of fire through friction between the shaft and bearing and adds greatly to the life of the device.

It is to be understood, of course, that while I have herein shown and described one specific embodiment of my invention, changes in form, construction and method of operation may be made within the scope of the appended claim.

I claim:

A bearing, comprising a plurality of upright corner pieces, a base member rigidly supported by said corner pieces, the upper end of said base member being provided with a cylindrical socket, a top member adjustably secured to the upper end of the corner pieces and provided with a cylindrical socket on the lower surface thereof, the said sockets of the base and top members being in axial alignment and a bearing member having a transverse opening and provided with upper and lower reduced trunnion portions adapted to fit within said cylindrical sockets in the base and top members.

CLAUDE C. HAIGLER.